United States Patent [19]

Saotome

[11] Patent Number: 4,814,616
[45] Date of Patent: Mar. 21, 1989

[54] RADIATION IMAGE RECORDING AND READ-OUT APPARATUS

[75] Inventor: Shigeru Saotome, Kanagawa, Japan

[73] Assignee: Fuji Photo Film Co., Ltd., Kanagawa, Japan

[21] Appl. No.: 181,350

[22] Filed: Apr. 14, 1988

[30] Foreign Application Priority Data

Apr. 16, 1987 [JP] Japan .................................. 62-93636

[51] Int. Cl.$^4$ ........................................... G01N 23/04
[52] U.S. Cl. ................................. 250/327.2; 250/484.1
[58] Field of Search ........... 250/327.2, 484.1, 327.2 L, 250/327.2 H, 327.2 D, 327.2 E, 327.2 F

[56] References Cited

U.S. PATENT DOCUMENTS

| | | | |
|---|---|---|---|
| 4,258,264 | 3/1981 | Kotera et al. | 250/327.2 |
| 4,400,619 | 8/1983 | Kotera et al. | 250/327.2 |
| 4,517,463 | 5/1985 | Gasiot et al. | 250/327.2 |
| 4,598,207 | 7/1986 | Naruse et al. | 250/327.2 |
| 4,629,890 | 12/1986 | Goto et al. | 250/327.2 |
| 4,691,232 | 9/1987 | Lange | 358/111 |

Primary Examiner—Janice A. Howell
Assistant Examiner—William F. Rauchholz
Attorney, Agent, or Firm—Sughrue, Mion, Zinn, Macpeak & Seas

[57] ABSTRACT

A radiation image recording and read-out apparatus comprises a secured stimulable phosphor sheet, a section for recording a radiation image on the stimulable phosphor sheet by irradiating radiation to the stimulable phosphor sheet from one surface side thereof, and a stimulating ray source for producing stimulating rays which cause the stimulable phosphor sheet to emit light. A scanning system is provided for two-dimensionally scanning the stimulating rays on the image-recorded stimulable phosphor sheet from the side opposite to the radiation incidence side. A first light guide member faces the stimulable phosphor layer of the stimulable phosphor sheet from the radiation incidence side, and a photodetector is coupled with an end face of the first light guide member for detecting the light emitted by the stimulable phosphor sheet and entering the first light guide member from the surface thereof. A second light guide member faces the stimulable phosphor layer from the radiation incidence side, and an erasing light source is coupled with an end face of the second light guide member.

7 Claims, 4 Drawing Sheets

RADIATION IMAGE RECORDING AND READ-OUT APPARATUS

BACKGROUND OF THE INVENTION

1. Field of the Invention

This invention relates to a radiation image recording and read-out apparatus for recording a radiation image on a stimulable phosphor sheet, exposing the stimulable phosphor sheet to stimulating rays which cause the stimulable phosphor sheet to emit light in proportion to the stored radiation energy, detecting the emitted light to read out the radiation image, and converting the emitted light into electric signals. This invention particularly relates to a radiation image recording and read-out apparatus which is small and light, and in which the mechanism is simplified.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then two-dimensionally scanned by stimulating rays such as a laser beam which cause the stimulable phosphor sheet to emit light in proportion to the stored radiation energy. The light emitted by the stimulable phosphor sheet upon stimulation thereof is photoelectrically detected and converted to electric image signals by a photodetector, and the radiation image of the object is reproduced as a visible image by use of the image signals on a recording medium such as a photographic film, a display device such as a cathode ray tube (CRT), or the like.

In the aforesaid radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

In order to reuse stimulable phosphor sheets as mentioned above, the radiation energy remaining on the stimulable phosphor sheet after it is scanned with stimulating rays to read out the radiation image stored thereon should be erased by exposure to light or heat as described in, for example, U.S. Pat. No. 4,400,619 or Japanese Unexamined Patent Publication No. 56(1981)-12599. The stimulable phosphor sheet should then be used again for radiation image recording.

From the aforesaid viewpoint, the applicant proposed in Japanese Unexamined Patent Publication No. 58(1983)-200269 a radiation image recording and read-out apparatus comprising, built in a single apparatus:

(i) a stimulable phosphor sheet capable of storing a radiation image thereon, (ii) an image recording section for recording a radiation image of an object on the stimulable phosphor sheet by exposing the stimulable phosphor sheet to radiation passing through the object, (iii) an image read-out section provided with a stimulating ray source for producing stimulating rays for scanning the stimulable phosphor sheet carrying the radiation image stored thereon at the image recording section, and a photoelectric read-out means for detecting light emitted by the stimulable phosphor sheet scanned with the stimulating rays to obtain electric image signals, and (iv) an erasing section for, prior to the next image recording on the stimulable phosphor sheet for which the image read-out has been carried out at the image read-out section, having the stimulable phosphor sheet release the radiation energy remaining on the stimulable phosphor sheet, whereby the stimulable phosphor sheet is used repeatedly for radiation image recording. With the proposed radiation image recording and read-out apparatus, the radiation image recording and read-out can be carried out sequentially and efficiently.

However, with the conventional radiation image recording and read-out apparatus, the stimulable phosphor sheet is conveyed for scanning with stimulating rays in the sub-scanning direction at the time of radiation image read-out, and therefore the apparatus is caused to become large and heavy and the mechanism is caused to become complicated by the conveyance mechanism for this purpose.

In order to eliminate the conveyance of the stimulable phosphor sheet, the applicant also proposed in Japanese Patent Application No. 62(1987)-21957 a radiation image recording and read-out apparatus wherein a stimulable phosphor sheet is maintained stationary, and a stimulating ray scanning system and a system for detecting light emitted by the stimulable phosphor sheet upon stimulation thereof are moved with respect to the stimulable phosphor sheet, thereby to carry out the radiation image read-out. However, with the proposed radiation image recording and read-out apparatus, though the stimulable phosphor sheet is maintained stationary, a mechanism for moving the stimulating ray scanning system and the system for detecting light emitted by the stimulable phosphor sheet is necessary. Therefore, even though the apparatus becomes small, a need exists for lightening of the apparatus and simplification of the mechanism.

SUMMARY OF THE INVENTION

The primary object of the present invention is to provide a radiation image recording and read-out apparatus which is small and light, and in which the mechanism is simplified substantially.

Another object of the present invention is to provide a radiation image recording and read-out apparatus which is small and light and has a substantially simplified mechanism, and which is suitable for obtaining a reproduced visible radiation image having an improved image quality, particularly a high diagnostic efficiency and accuracy.

The present invention provides a first radiation image recording and read-out apparatus comprising:

(i) a stimulable phosphor sheet capable of storing a radiation image thereon and secured at a predetermined position, (ii) an image recording section for storing a radiation image on said stimulable phosphor sheet by irradiating radiation carrying said radiation image to said stimulable phosphor sheet from one surface side thereof, (iii) a stimulating ray source for producing stimulating rays which stimulate the stimulable phosphor of said stimulable phosphor sheet and cause the stimulable phosphor to emit light carrying said radiation image, (iv) a two-dimensional scanning means for two-dimensionally scanning said stimulating rays on said stimulable phosphor sheet carrying said radiation image stored thereon from the side opposite to said one surface of said stimulable phosphor sheet, (v) a first light guide member facing the stimulable phosphor layer of said stimulable phosphor sheet from the radiation incidence side, (vi) a photodetector optically coupled with an end face of said first light guide member for photoelectrically detecting said light emitted by said stimulable phosphor sheet and entering said first light guide member from the surface thereof, (vii) a second light guide member facing the stimulable phosphor layer of said stimulable phosphor sheet from the radiation incidence side, and (viii) an erasing light source optically coupled with an end face of said second light guide member for producing erasing light for releasing the radiation energy remaining on said stimulable phosphor sheet.

The light emitted by the stimulable phosphor sheet and impinging upon the surface of the first light guide member advances to the end face of the first light guide member by repeating total reflection inside of the first light guide member. Therefore, the light emitted by the stimulable phosphor sheet is radiated at a high intensity in the condensed form from the end face of the first light guide member, and the amount of the emitted light is detected by the photodetector optically coupled with the end face of the first light guide member.

On the other hand, the erasing light produced by the erasing light source optically coupled with the end face of the second light guide member is uniformly and broadly radiated from the overall surface of the second light guide member to the stimulable phosphor sheet. Therefore, the radiation energy remaining on the stimulable phosphor sheet after the radiation image read-out from the stimulable phosphor sheet is finished can be released.

The present invention also provides a second radiation image recording and read-out apparatus characterized by, instead of guiding the light emitted by the stimulable phosphor sheet by use of the first light guide member, providing a light guide means to face approximately the, overall surface of the stimulable phosphor sheet on the side opposite to the radiation incidence side, guiding the light emitted by every portion of the stimulable phosphor sheet to a predetermined light guiding position, and detecting the light emitted by the stimulable phosphor sheet by use of a photodetector disposed at the light guiding position.

With the first and second radiation image recording and read-out apparatuses in accordance with the present invention, it is not necessary to provide a mechanism for moving the stimulable phosphor sheet for the purpose of scanning with stimulating rays in the sub-scanning direction, and a mechanism for moving the stimulating ray scanning system and the system for detecting the light emitted by the stimulable phosphor sheet. Therefore, the apparatus configuration is simplified markedly, and the apparatus becomes smaller and lighter than the conventional apparatus. Particularly, with the first radiation image recording and read-out apparatus in accordance with the present invention wherein the light emitted by the stimulable phosphor sheet is guided by use of the light guide member having a very simple configuration, the light emitted by the stimulable phosphor sheet can be detected very efficiently, and read-out image signals having a high S/N ratio can be obtained. Accordingly, the first radiation image recording and read-out apparatus in accordance with the present invention enables reproduction of a visible radiation image having an improved image quality, particularly a high diagnostic efficiency and accuracy.

DESCRIPTION OF THE PREFERRED EMBODIMENTS

The present invention will hereinbelow be described in further detail with reference to the accompanying drawings.

Figure 1:
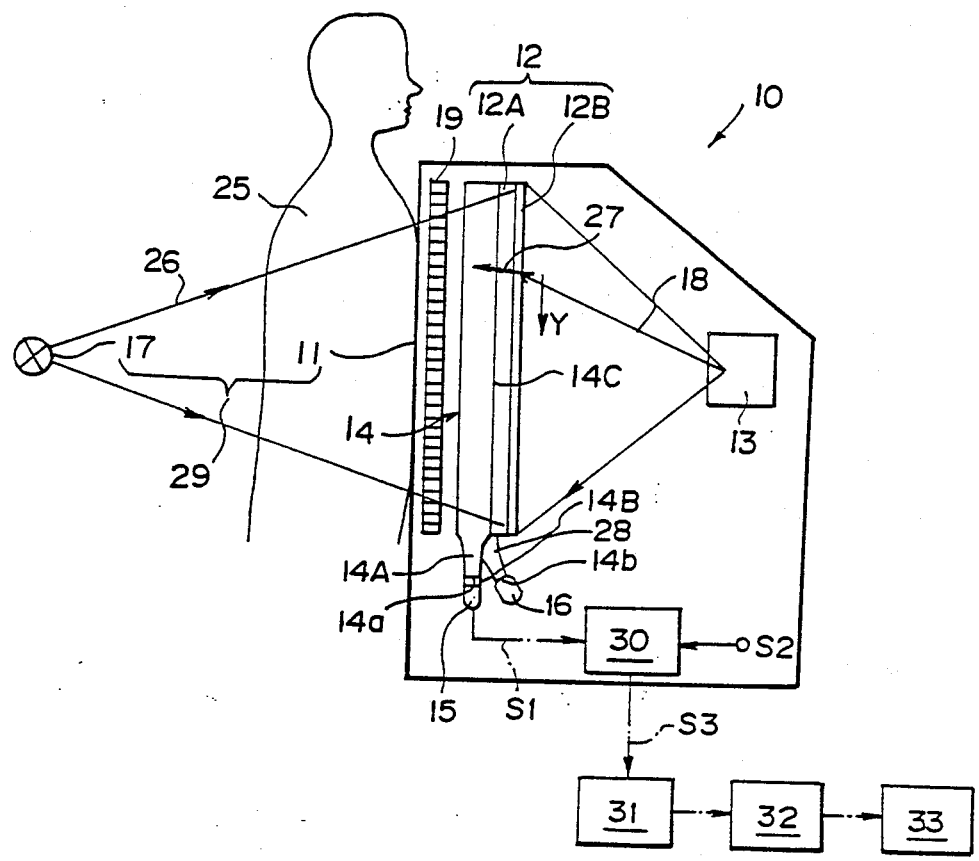
FIG. 1 is a schematic side view showing an embodiment of the first radiation image recording and read-out apparatus in accordance with the present invention.

With reference to FIG. 1, a radiation image recording and read-out apparatus 10 as an embodiment of the first radiation image recording and read-out apparatus in accordance with the present invention comprises a stimulable phosphor sheet 12 facing an image recording stand 11, a stimulating ray irradiation system 13 for irradiating stimulating rays as will be described later to the stimulable phosphor sheet 12, a light guide member 14 closely contacting the stimulable phosphor sheet 12 from the side opposite to the stimulating ray irradiation system 13, i.e. from the side of the image recording stand 11, a photodetector 15 and an erasing light source 16 optically coupled with the lower end faces of the light guide member 14, and a radiation source 17 constituted by an X-ray tube or the like and disposed to face the image recording stand 11.

Figure 2:
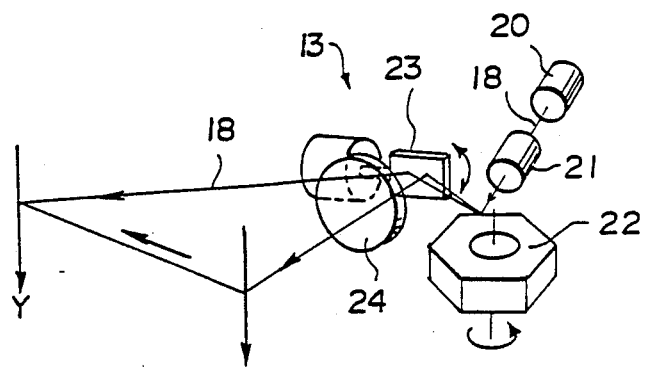
FIG. 2 is a perspective view showing the stimulating ray irradiation system employed in the embodiment shown in FIG. 1.

The stimulable phosphor sheet 12 is composed of a transparent supporting material-12A and a stimulable phosphor layer 12B overlaid thereon, and is disposed with the stimulable phosphor layer 12B facing the stimulating ray irradiation system 13. The stimulating ray irradiation system 13 is constituted for two-dimensionally scanning stimulating rays 18, which stimulate the stimulable phosphor layer 12B, on the stimulable phosphor sheet 12 in the main scanning direction at an angle normal to the drawing sheet in FIG. 1, and in the subscanning direction as indicated by the arrow Y approximately normal to the main scanning direction. For example, as shown in FIG. 2, the stimulating ray irradiation system 13 comprises a semiconductor laser 20 as a stimulating ray source for producing the stimulating rays (laser beam) 18, a beam expander 21 for adjusting the beam diameter of the stimulating rays 18, and a rotating polygon mirror 22 for reflecting and deflecting the stimulating rays 18 in one direction. The stimulating ray irradiation system 13 also comprises a galvanometer mirror 23 for reflecting and deflecting the stimulating rays 18, which have been reflected and deflected by the rotating polygon mirror 22, in a direction approximately normal to the direction of deflection by the rotating polygon mirror 22, and a two-dimensional fθ lens 24 for maintaining constant the beam diameter of the deflected stimulating rays 18 on the stimulable phosphor sheet 12 regardless of the scanning position.

Figure 3:
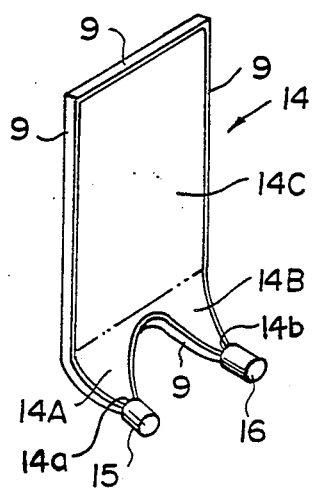
FIG. 3 is a perspective view showing the light guide member employed in the embodiment shown in FIG. 1.

As shown in FIG. 3, the light guide member 14 is formed of a transparent plastic material, and is composed of a rectangular portion having the same size as the size of the stimulable phosphor sheet 12, and an output portion 14A for the light emitted by the stimulable phosphor sheet 12 and an erasing light input portion 14B which are protruded downward from the rectangular portion. The photodetector 15 is constituted by a photomultiplier or the like, and is coupled with an end face 14a of the output portion 14A for the light emitted by the stimulable phosphor sheet 12. The erasing light source 16 is constituted by a tungsten-filament lamp, a halogen lamp or the like, and is coupled with an end face 14b of the erasing light input portion 14B. Also, in this embodiment, a grid 19 is provided between the image recording stand 11 and the light guide member 14.

In the course of recording a radiation image of an object 25 by use of the radiation image recording and readout apparatus 10 having the aforesaid configuration, the object 25 is placed in front of the image recording stand 11, and the radiation source 17 is activated in this condition. Radiation 26 which may be X-rays or the like and which is produced by the radiation source 17 passes through the object 25, and is irradiated onto the stimulable phosphor sheet 12. In this manner, a radiation image of the object 25 is stored on the stimulable phosphor layer 12B of the stimulable phosphor sheet 12. Specifically, in this embodiment, an image recording section 29 is constituted by the image recording stand 11 and the radiation source 17. The grid 19 absorbs radiation scattered in the object 25 in the course of the radiation image recording.

At the time the radiation image stored on the stimulable phosphor sheet 12 in the manner as mentioned above is to be read out, the stimulating rays 18 are twodimensionally scanned on the stimulable phosphor sheet 12 by the stimulating ray irradiation system 13. The portion of the stimulable phosphor sheet 12 exposed to the stimulating rays 18 emits light 27 in a light amount proportional to the radiation energy stored thereon. The light 27 emitted by the stimulable phosphor sheet 12 enters the light guide member 14 from a surface 14C of the light guide member 14 facing the stimulable phosphor sheet 12, advances to the end face of the light guide member 14 by repeating total reflection inside of the light guide member 14, and is radiated in the condensed form from the end face 14a having an area markedly smaller than the area of the surface 14C. Also, as shown in FIG. 3, the light guide member 14 is provided with reflection members 9, 9, . . . formed of metal-deposited films or the like on end faces outside of the end face 14a and the end face 14b coupled with the erasing light source 16. Therefore, the light 27 emitted by the stimulable phosphor sheet 12 is radiated mainly from the end faces 14a and 14b. As the reflection members 9, 9, . . . , metal surfaces, a white paint or the like may also be used.

The light 27 emitted by the stimulable phosphor sheet 12 and radiated from the end face 14a of the light guide member 14 is detected by the photodetector 15. Therefore, the output S1 of the photodetector 15 represents the light amount of the light 27 emitted by the stimulable phosphor sheet 12. The output S1 of the photodetector 15 is fed to a read-out circuit 30 which carries out processing such as amplification and logarithmic conversion of the output S1. Also, the output S1 is integrated at predetermined intervals on the basis of synchronizing signals S2 which are synchronous with the scanning of the stimulating rays 18. In this manner, analog read-out image signals S3 which are divided in accordance with picture elements are generated sequentially by the read-out circuit 30. By way of example, the read-out image signals S3 are then converted by an A/D converter 31 into digital signals, subjected to signal processing (image processing) such as gradation processing and frequency response processing in an image processing circuit 32, and fed to an image reproducing apparatus 33 constituted by a CRT, a printer or the like, for use in reproduction of the radiation image, which was stored on the stimulable phosphor sheet 12, into a visible image.

After the radiation image read-out is finished in the manner as mentioned above, the erasing light source 16 is turned on. The erasing light source 16 mainly produces erasing light having a wavelength within the stimulation wavelength range for the stimulable phosphor layer 12B of the stimulable phosphor sheet 12. The erasing light enters the erasing light input portion 14B from the end face 14b, and advances inside of the light guide member 14 by repeating total reflection. The erasing light is radiated at a nearly uniform intensity from the surface 14C of the light guide member 14. Therefore, the stimulable phosphor layer 12B of the stimulable phosphor sheet 12 is uniformly exposed to the erasing light. As a result, the radiation energy remaining on the stimulable phosphor layer 12B after the image read-out was finished is released, and the stimulable phosphor sheet 12 becomes reusable for the radiation image recording. At the time of the image erasing, the photodetector 15 is turned off so that it is not damaged by the intense erasing light.

With the aforesaid embodiment wherein the light 27 emitted by the stimulable phosphor sheet 12 is efficiently guided by the light guide member 14 having a very simple shape and is detected, the S/N ratio of the read-out image signals S3 can be improved and the apparatus can be made small and light.

The stimulating rays 18 passing through the stimulable phosphor sheet 12 may enter the light guide member 14. Therefore, a filter 28 for intercepting the stimulating rays 18 should preferably be provided between the end face 14a of the light guide member 14 and the photodetector 15.

As the photodetector 15, a photo-conductor type or a PIN photo-diode may be employed as well as the aforesaid type. In the case where a picture element division type sensor such as the SIT-type, CCD-type, or MOS-type solid state semiconductor device is employed, signal processing such as integration is carried out.

With the aforesaid embodiment wherein the stimulable phosphor sheet 12 is not moved, a stimulable phosphor sheet 12 composed of a supporting material and the stimulable phosphor layer 12B directly formed by vacuum evaporation of the stimulable phosphor on the supporting material may be employed. Specifically, with the aforesaid embodiment, there is no risk of the stimulable phosphor film formed by vacuum evaporation being caused to peel off from the supporting material by movement of the stimulable phosphor sheet. This also applies to the embodiments as will be described below.

Figure 5:
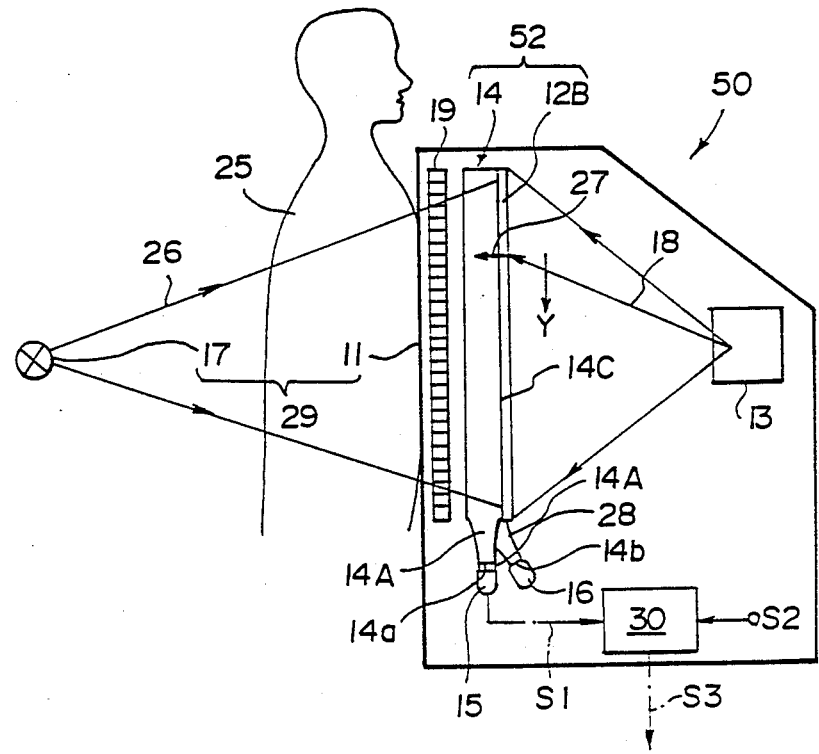
FIG. 5 is a schematic side view showing another embodiment of the first radiation image recording and read-out apparatus in accordance with the present invention.

Another embodiment of the first radiation image recording and read-out apparatus in accordance with the present invention will be described hereinbelow with reference to FIG. 5. In FIG. 5, similar elements are numbered with the same reference numerals with respect to FIG. 1. In a radiation image recording and read-out apparatus 50, the stimulable phosphor layer 12B is formed on the surface 14C of the light guide member 14. Specifically, in this embodiment, a stimulable phosphor sheet 52 is formed by utilizing the light guide member 14 as the supporting material.

With the radiation image recording and read-out apparatus 50, recording, read-out and erasing of the radiation image are carried out in the same manner as in the aforesaid radiation image recording and read-out apparatus 10. Also, with the radiation image recording and read-out apparatus 50, the light 27 emitted by the stimulable phosphor sheet 12 is not absorbed by the supporting material 12A of the stimulable phosphor sheet 12 as in the radiation image recording and read-out apparatus 10 shown in FIG. 1, and therefore the efficiency of detection of the light 27 emitted by the stimulable phosphor sheet 12 can be improved.

With the aforesaid embodiments, a single light guide member 14 acts as the first light guide member for guiding the light 27 emitted by the stimulable phosphor sheet 12 and the second light guide member for irradiating the erasing light at a uniform intensity onto the stimulable phosphor sheet 12 or the stimulable phosphor sheet 52. However, the first light guide member and the second light guide member may be provided independently of each other. In this case, the first light guide member is provided on the side of the stimulable phosphor sheet 12 or the stimulable phosphor sheet 52, and the second light guide member is provided outward from the stimulable phosphor sheet 12 or the stimulable phosphor sheet 52, i.e. on the side of the image recording stand 11.

Figure 4:
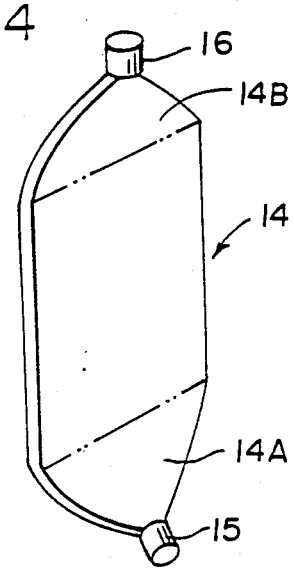
FIG. 4 is a perspective view showing another example of the light guide member which may be employed in the first radiation image recording and read-out apparatus in accordance with the present invention.

In the case where the first light guide member and the second light guide member are constituted by a single common light guide member, the output portion 14A for the light emitted by the stimulable phosphor sheet and the erasing light input portion 14B may be spaced from each other as shown in FIG. 4.

Figure 6:
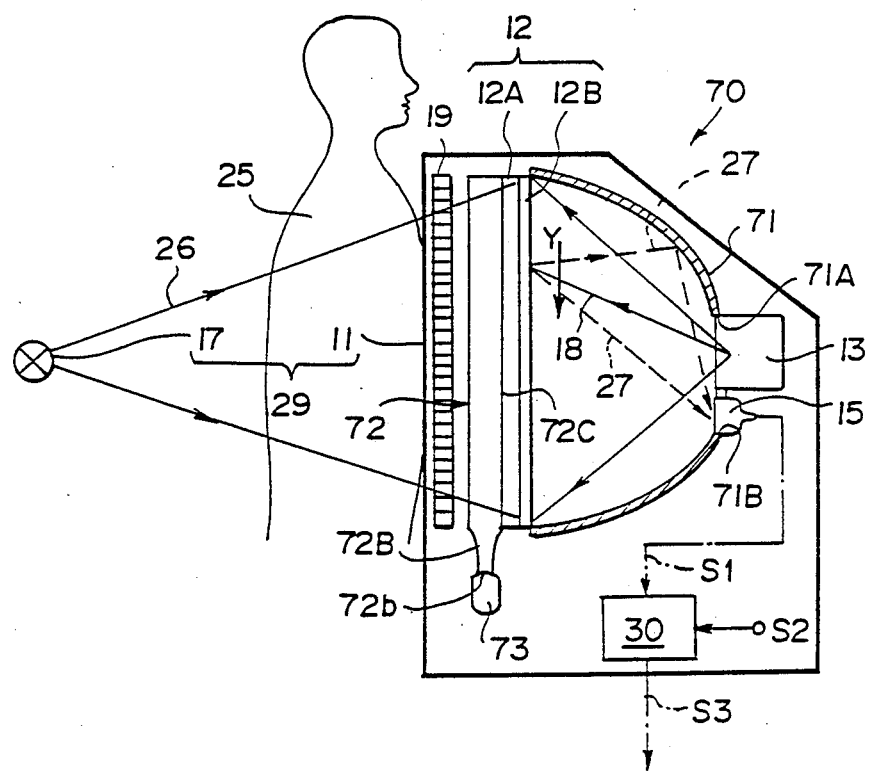
FIG. 6 is a schematic side view showing an embodiment of the second radiation image recording and read-out apparatus in accordance with the present invention.

An embodiment of the second radiation image recording and read-out apparatus in accordance with the present invention will hereinbelow be described with reference to FIG. 6. A radiation image recording and read-out apparatus 70 is provided with a light guide means 71 having an integrating sphere-like shape and facing the overall surface of the stimulable phosphor sheet 12 from the side opposite to the incidence side of the radiation 26. The closed end of the light guide means 71, i.e. the right end thereof in FIG. 6, is provided with openings 71A and 71B. The stimulating ray irradiation system 13 is provided to face the surface of the stimulable phosphor sheet 12 via the opening 71A. Also, in the same manner as in the aforesaid embodiments, the stimulating rays 18 are two-dimensionally scanned on the stimulable phosphor sheet 12 by the stimulating ray irradiation system 13. The light guide means 71 is provided with a light reflecting layer on the inner surface and is shaped to guide the light 27 emitted by every portion of the stimulable phosphor sheet 12 upon exposure to the stimulating rays 18 to the opening 71B. Also, the light guide means 71 is shaped for guiding the light 27 emitted by the stimulable phosphor sheet 12 to a predetermined light guiding position at an approximately constant light guiding efficiency regardless of the light emitting position on the stimulable phosphor sheet 12, i.e. regardless of the position of the stimulating ray irradiation. At the light guiding position of the light 27 emitted by the stimulable phosphor sheet 12, the photodetector 15 is provided for detecting the guided light 27 via the opening 71B. As the photodetector 15, various types may be employed as mentioned above.

A light guide member 72 for irradiation of the erasing light is provided on the side of the supporting material 12A of the stimulable phosphor sheet 12, i.e. on the radiation incidence side. The light guide member 72 closely contacts the supporting material 12A, and is provided with an erasing light input portion 72B of the same type as the erasing light input portion 14B in the embodiment shown in FIG. 1. An erasing light source 73 is optically coupled with a lower end 72b of the erasing light input portion 72B. As the erasing light source 73, a light source mainly producing light having a wavelength within the stimulation wavelength range for the stimulable phosphor sheet 12 is selected.

The radiation image recording with the radiation image recording and read-out apparatus 70 having the aforesaid configuration is carried out in the same manner as in the embodiments shown in FIGS. 1 and 5.

Also, in the course of the image read-out from the stimulable phosphor sheet 12 carrying a radiation image stored thereon, the stimulating rays 18 are two-dimensionally scanned on the stimulable phosphor sheet 12 by the stimulating ray irradiation system 13 in the same manner as in the aforesaid embodiments. The light 27 is emitted by the portion of the stimulable phosphor sheet 12 exposed to the stimulating rays 18. The emitted light 27 is guided by the light guide means 71, and is photoelectrically detected by the photodetector 15 provided at the light guiding position of the light guide means 71. The output S1 of the photodetector 15 is processed in the same manner as in the aforesaid embodiments, and is used for reproduction of the radiation image which was stored on the stimulable phosphor sheet 12.

After the image read-out is finished, the erasing light source 73 is turned on. The erasing light produced by the erasing light source 73 advances inside of the light guide member 72 by repeating the total reflection as mentioned above, and is radiated at a nearly uniform intensity from a surface 72C of the light guide member 72 onto the stimulable phosphor sheet 12. Upon exposure to the erasing light, the radiation energy remaining on the stimulable phosphor layer 12B is released, and the stimulable phosphor sheet 12 becomes reusable for radiation image recording.

In the radiation image recording and read-out apparatus 70 provided with the light guide means 71, the stimulable phosphor layer 12B may be formed by vacuum evaporation or the like on the surface 72C of the light guide member 72 for irradiation of the erasing light, and the light guide member 72 provided with the stimulable phosphor layer 12B may be utilized as the stimulable phosphor sheet.

In the case where the light guiding efficiency of the light guide means 71 fluctuates in accordance with the position of light emission from the stimulable phosphor sheet 12, the fluctuations in the light guiding efficiency may be compensated for by, for example, detecting the fluctuation characteristics and providing a correction table for correcting the read-out image signals on the basis of the detected fluctuation characteristics.

I claim:

1. A radiation image recording and read-out apparatus comprising:
   (i) a stimulable phosphor sheet capable of storing a radiation image thereon and secured at a predetermined position,
   (ii) an image recording section for storing a radiation image on said stimulable phosphor sheet by irradiating radiation carrying said radiation image to said stimulable phosphor sheet incident onto one surface side thereof,
   (iii) a stimulating ray source for producing stimulating rays which stimulate the stimulable phosphor of said stimulable phosphor sheet and cause the stimulable phosphor to emit light carrying said radiation image,
   (iv) a two-dimensional scanning means for two-dimensionally scanning said stimulating rays on said stimulable phosphor sheet carrying said radiation image stored thereon from the side opposite to said one surface of said stimulable phosphor sheet,
   (v) a first light guide member facing the stimulable phosphor layer of said stimulable phosphor sheet from the radiation incidence side,
   (vi) a photodetector optically coupled with an end face of said first light guide member for photoelectrically detecting said light emitted by said stimulable phosphor sheet and entering said first light guide member from the surface thereof,
   (vii) a second light guide member facing the stimulable phosphor layer of said stimulable phosphor sheet from the radiation incidence side, and
   (viii) an erasing light source optically coupled with an end face of said second light guide member for producing erasing light for releasing the radiation energy remaining on said stimulable phosphor sheet.

2. An apparatus as defined in claim 1 wherein a single light guide member is used in common as said first light guide member and said second light guide member.

3. An apparatus as defined in claim 2 wherein said stimulable phosphor sheet is formed by utilizing said first light guide member as a supporting material, and overlaying the stimulable phosphor layer on the surface of said first light guide member on the side opposite to said radiation incidence side.

4. An apparatus as defined in claim 1 wherein said stimulable phosphor sheet is formed by utilizing said first light guide member as a supporting material, and overlaying the stimulable phosphor layer on the surface of said first light guide member on the side opposite to said radiation incidence side.

5. An apparatus as defined in claim 1, 2, 4 or 3 wherein said stimulable phosphor sheet is composed of a supporting material and the stimulable phosphor layer overlaid thereon by vacuum evaporation.

6. A radiation image recording and read-out apparatus comprising:
   (i) a stimulable phosphor sheet capable of storing a radiation image thereon and secured at a predetermined position,
   (ii) an image recording section for storing a radiation image on said stimulable phosphor sheet by irradiating radiation carrying said radiation image to said stimulable phosphor sheet incident onto one surface side thereof,
   (iii) a stimulating ray source for producing stimulating rays which stimulate the stimulable phosphor of said stimulable phosphor sheet and cause the stimulable phosphor to emit light carrying said radiation image,
   (iv) a two-dimensional scanning means for two-dimensionally scanning said stimulating rays on said stimulable phosphor sheet carrying said radiation image stored thereon from the side opposite to said one surface of said stimulable phosphor sheet,
   (v) a light guide means facing said one surface of said stimulable phosphor sheet over nearly the overall area of said one surface for guiding said light emitted by every portion of said stimulable phosphor sheet to a predetermined light guiding position,
   (vi) a photodetector provided at said light guiding position for photoelectrically detecting said light emitted by said stimulable phosphor sheet and guided,
   (vii) a light guide member facing the stimulable phosphor layer of said stimulable phosphor sheet from the radiation incidence side, and
   (viii) an erasing light source optically coupled with an end face of said light guide member for producing erasing light for releasing the radiation energy remaining on said stimulable phosphor sheet.

7. An apparatus as defined in claim 6 wherein said stimulable phosphor sheet is formed by utilizing said light guide member as a supporting material and overlaying the stimulable phosphor layer on the surface of said light guide member on the side opposite to said radiation incidence side.

* * * * *